United States Patent [19]

Plangetis

[11] Patent Number: 5,239,978
[45] Date of Patent: Aug. 31, 1993

[54] OSCILLATORY ABRASIVE CABLE POWER SAW

[75] Inventor: Gus F. Plangetis, Annapolis, Md.

[73] Assignee: The United States of America as represented by the Secretary of the Navy, Washington, D.C.

[21] Appl. No.: 953,388

[22] Filed: Sep. 30, 1992

[51] Int. Cl.⁵ .............................................. B24B 23/00
[52] U.S. Cl. ................... 125/16.01; 125/19; 83/651.1; 51/170 TL; 51/271
[58] Field of Search ............. 125/16.01, 16.03, 19; 51/57, 170 TL, 252, 268, 269, 271; 83/651.1, 200.1

[56] References Cited

U.S. PATENT DOCUMENTS

| | | | |
|---|---|---|---|
| 1,802,078 | 4/1931 | Exley | 51/268 |
| 2,049,172 | 7/1936 | Osgood | 83/651.1 |
| 2,247,215 | 6/1941 | Wegner et al. | 125/19 |
| 4,258,763 | 3/1981 | Figueredo et al. | 83/651.1 |

FOREIGN PATENT DOCUMENTS

| | | | |
|---|---|---|---|
| 0573143 | 3/1933 | Fed. Rep. of Germany | 51/170 TL |
| 1581132 | 12/1980 | United Kingdom | 83/651.1 |

Primary Examiner—Robert A. Rose
Attorney, Agent, or Firm—Charles D. Miller

[57] ABSTRACT

An angularly reciprocating pivotable yoke, driven by a motor or a power tool, is attached to respective ends of an abrasive coated cable or wire blade to draw the blade back and forth over a workpiece and provide cutting thereof, particularly in close quarters where little clearance is provided adjacent a workpiece. A telescoping housing includes a movable protective cover for protection of both the user and the mechanism. A safety switch is provided for preventing operation of the mechanism when the protective cover does not cover moving parts of the mechanism. A pivotable support for attachment of the ends of the blade to ends of the pivotable yoke is preferably of cylindrical form and which has a slotted aperture for receiving the blade and a recess for receiving an enlarged blade end, preferably formed by a piece of tubing crimped to the blade. The cylindrical support is retained in a slot in ends of the pivotable yoke by a spring and a cylindrical spacer so that the cylindrical support may freely rotate in the slot in the reciprocating yoke.

22 Claims, 2 Drawing Sheets

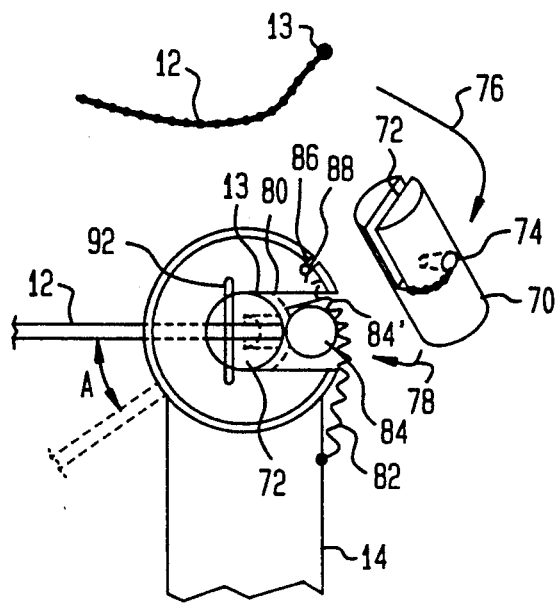
FIG. 4
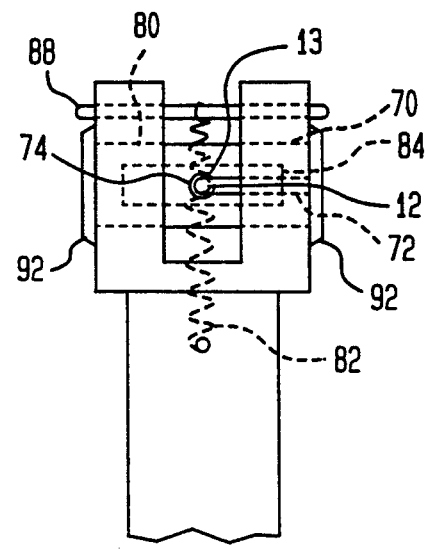
FIG. 5
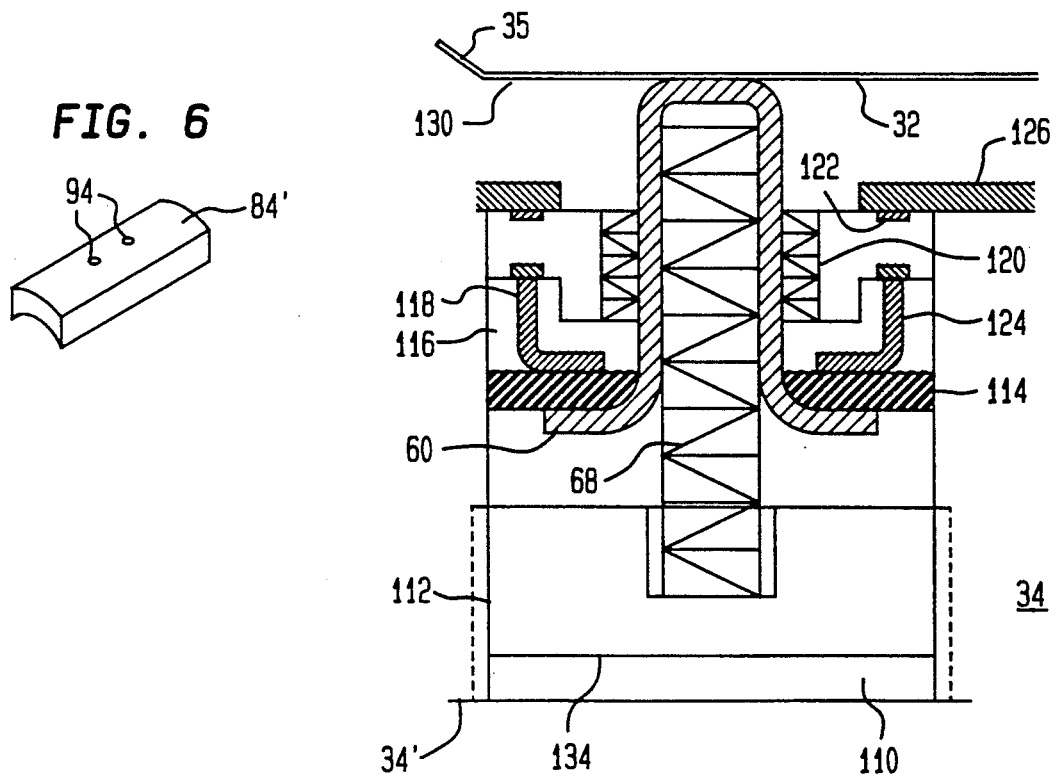
FIG. 6
FIG. 7

OSCILLATORY ABRASIVE CABLE POWER SAW

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to material cutting mechanisms and, more particularly, to oscillatory blade power saws.

2. Description of the Prior Art

The cutting of materials is often required in the fabrication and repair of various structures. In structures which are subject to corrosion or rusting such as in plumbing and automotive applications, in particular, existing parts must often be cut away in order to make repairs. In these particular environments, clearances are often exceptionally close since ease of repair does not justify design of greater clearances in view of the relative infrequency with which such repairs will be required, often at intervals of several years or more. Often, in plumbing environments, installation will be guided solely by economy with little or no thought being accorded to ease of repair beyond the requirements of regulatory codes.

Cutting mechanisms have taken several forms in consideration of the problem of removal of the material for the cut itself. In some types of pipe cutters using a sharpened wheel which rides against the cylindrical section of pipe to be cut, the material is malleably deformed at the edge of the cut. This technique is generally successful even at high relative hardnesses of the material to be cut if the thickness through which the cut is made is small.

Heat has also often been used to cut materials by burning or melting of the material. However, the geometry and other properties of the resulting material will often be adversely affected. For instance, it will often be necessary for melted material to be removed from the material after cutting is completed. Also, either the heating required for the cutting or the technique such as grinding used to remove melted material or both may compromise protective coatings such as galvanizing.

Generally, saws have provided the best technique of cutting materials since saw blades are generally fabricated in a manner to provide for a kerf of the cut which provides ample clearance for the saw blade and also provides for the carrying of materials from the kerf. However, sawing of malleable metals often causes distortion of the material cut, such as deforming tubing out of round, making the joining to other fittings difficult.

A problem common to all of the above cutting techniques is the requirement of space around the object to be cut. For instance, wheel-type pipe cutters require space for the wheel to be carried around the entire periphery of a pipe as well as some mechanism for bearing against opposing surfaces of the pipe and applying pressure from the cutting wheel to the pipe. Cutting arrangements using heat require sufficient space to avoid application of damaging amounts of heat to adjacent structures and invariably present a fire hazard. Saws must be reciprocated and common, rigid, blades require a clearance equal to a convenient length of saw stroke, commonly equal to the cross-sectional dimension in the direction of the cut so that material cut from the saw kerf can be carried out of the kerf, avoiding filling of the saw blade interstices between the teeth thereof.

More recently, flexible "saw" blades have been developed which consist of a flexible wire which is coated with a relatively coarse abrasive such as tungsten carbide particles. Principal applications of such blades have been where transportation of the "blade" to the location of the cut has been difficult, such as with tree limbs where a rope can be used to carry the blade into position and to reciprocate the blade against the material to be cut. In this way, the blade can often be reciprocated against the work from a relatively remote location.

Such abrasive wires have also been used in metal-cutting "hacksaws" where the abrasive wire is stretched in a straight line across the frame of the saw body rather than freely wrapped about the periphery of a workpiece such as a tree limb. However, such applications of abrasive wires has not been fully successful since the abrasive wire, unlike a conventional saw blade, does not have a planar spine which helps to guide the direction of the blade in the cut. Further, the abrasive coated wire is generally thicker than the set of teeth (e.g. the bending of teeth to both sides of the saw blade so that the kerf is wider than the thickness of the blade to provide relief from binding of the blade and workpiece) on a conventional blade. Therefore, the abrasive wire makes a larger kerf and requires the removal of more material. While the abrasive wire cuts quickly because material is removed in both directions of the stroke, the amount of additional work incident to the removal of more material from the kerf as well as the difficulty of blade control, mentioned above, have outweighed the advantage of greater potential cutting speed.

In any event, the use of abrasive wires in other replaceable blade saw frames does not improve the convenience of using such saws in close quarters. On the contrary, so-called "close quarters hack saws are merely blade holders which do not provide for applying tension to the blade but, instead, rely on the stiffness of conventional hack saw blades.

All of the above material cutting arrangements described above have been of the manually operated type which is generally preferred or necessary when cutting must be done in close quarters with restricted clearances. Power saws are generally of either a stationary or portable type and stationary saws (e.g. table saws, band saws and the like) where the workpiece must be brought to the saw are simply not appropriate to work in close quarters. Portable saws are generally of the circular or reciprocating type.

Circular saws are characterized by circular blades which may be of different diameters to achieve desired tooth velocities or to accommodate different sizes of work. However, since the blade must be rotated from its center, it is not usually applicable to close quarters. Since the cutting depth is limited to the radius of the blade, the clearance for a cut where the blade reaches through the workpiece must be almost as large as the diameter of the blade. Even if a circular blade of small diameter could be passed around the periphery of a workpiece such as a pipe, the minimum clearance would be similar to that of wheel-type pipe cutters mentioned above and other difficult problems would arise such as guiding the blade and the provision of an angled drive at small size capable of transmitting sufficient power to efficiently cut materials such as metals.

Reciprocating power saws are known, as well, and are marginally better suited to work with small clearances. However, to avoid clogging of the teeth of the blade, reciprocating power saws must have a stroke which slightly exceeds the maximum depth of cut. Therefore, reciprocating power saws are usually designed with a stroke of at least one inch or greater so that a common material thickness of ¾ inch can be efficiently cut without blade clogging. The blade stroke is fixed in the geometry of the saw and generally cannot be changed. Even if the stroke could be changed, the avoidance of blade clogging infers that the blade stroke must cause the blade to protrude from the rear of the workpiece by a distance equal to the thickness of the workpiece.

In summary, the geometrical constraints imposed by the operation or construction of saw blades has severely limited their applicability to work having close clearances, particularly for power saws. In applications having close clearances, there is often no alternative to manual saws which, even then, cannot be conveniently used, if usable at all. At the present state of the art, a minimum clearance of required for virtually any type of cutting tool. Further, the operation of any tool in close quarters causes an increased safety risk, particularly with power tools.

SUMMARY OF THE INVENTION

It is therefore an object of the present invention to provide a power saw capable of operation with clearance of under one-half inch.

It is a further object of the invention to provide a power saw which may be safely operated in close quarters.

It is a further object of the invention to provide a safety interlock which integrates a power switch with a cover for moving parts of a power tool.

In order to accomplish these and other objects of the invention, a saw blade driving mechanism for reciprocatingly drawing a flexible, abrasive coated wire across a workpiece is provided including, a housing, a pivotable yoke including a pivot supported by the housing, a power input for reciprocatingly driving the pivotable yoke through a predetermined angle about the pivot, a protective cover attached to said housing and positionable to cover at least a portion of the pivotable yoke, and a switch arranged to be responsive to the protective cover being positioned to cover said at least a portion of the pivotable yoke.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a top view of a preferred structure for securing the blade to the reciprocating mechanism, FIG. 5 is a side view of a preferred structure for securing the blade to the reciprocating mechanism, FIG. 6 is an alternative form of spacer 84 of FIGS. 4 and 5, and FIG. 7 illustrates a preferred structure of the switch of FIG. 3.

DETAILED DESCRIPTION OF A PREFERRED EMBODIMENT OF THE INVENTION

Figure 1:
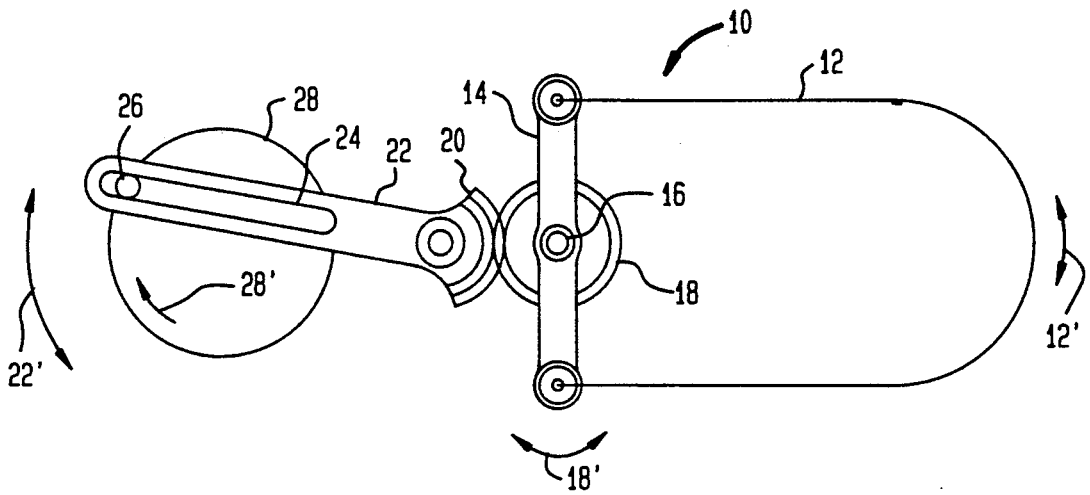
FIG. 1 is a top view of the blade reciprocating mechanism in accordance with the invention.

Referring now to the drawings, and more particularly to FIG. 1, there is shown a preferred form of a saw blade driving mechanism 10 for reciprocating an abrasive coated wire blade 12 which is connected between the ends of pivotable yoke 14. Yoke 14 is symmetrical about pivot 16 so that matched distances of reciprocating motion of the blade 12 will be produced when the yoke 14 is pivoted to alternately pull respective ends of blade 12 to draw it back and forth across a workpiece 11. This equal motion allows the blade to be tensioned against a workpiece by force applied through a housing 30 and internal structure of the saw to pivot 16 which is preferably formed as a sleeve bearing in order to carry such a force. However, other forms of bearings such as preload adjustable ball bearings (in which the ball races are asymmetrically formed so that adjustments for wear can be made by applying a compressional force against the bearings in the direction of the pivot axis) can also be used and may be preferable in larger embodiments of the invention where greater loads and wear may be anticipated.

A drive gear 18 meshed with sector gear 20 is attached to yoke 14 in order to provide reciprocating drive thereto. While drive gear 18 is shown as a full circular gear, for clarity, it need only be a sector slightly greater than the preferred range of angular motion of yoke 14, preferably about 90°. Sector gear 20 is, in turn reciprocatingly driven by a pivoted arm 22 which has similar bearings to the bearings provided at pivot 16, although no blade tensioning force will be carried thereby. (The meshing of gears 20 and 18 is shown somewhat offset from the correct position for clarity of illustration.)

Pivoted arm 22 preferably includes a slot 24 which is engaged by pin 26. Pin 26 is, in turn, driven through a circular locus by a rotary drive means, schematically illustrated at 28. The preferred form of mounting pin 26 is on a generally circular disc, portions of which may be cut away or weighted for providing vibration reduction by counterbalancing in a manner well-understood in the art. However, the preferred mechanism, as shown, generally requires very little counterbalancing due to the counter rotation of arm 22 and the assembly of yoke 14 and gear 18. Thus, as rotary drive means 28 rotates in the direction (which is arbitrary) indicated by arrow 28', arm 22 and sector gear 20 are reciprocatingly rotated as indicated by arrows 22'. The meshing of sector gear 20 with drive gear 18 thus causes reciprocation of yoke 14 in the directions indicated by arrows 18' causing reciprocation of blade 12 as indicated by arrows 12'.

Figure 2:
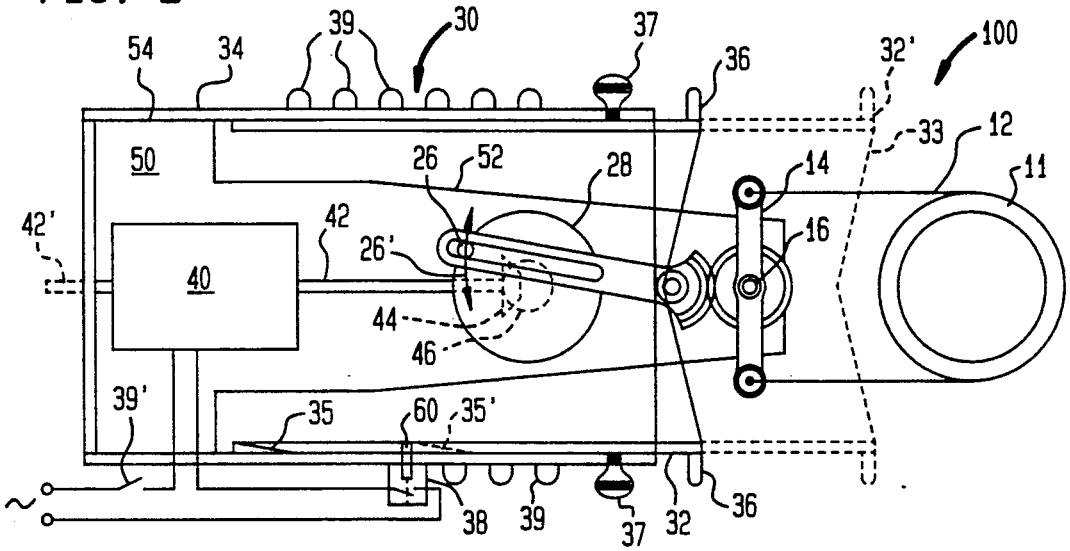
FIG. 2 is a top cutaway view of the housing, internal frame, motor, safety switch and reciprocating mechanism in accordance with the invention.

The overall preferred arrangement of the saw in accordance with the invention is shown in the partially cut-away top view of FIG. 2 which carries the mechanism of FIG. 1. It must be understood that the mechanism of FIG. 1 must be protected from damage such as yoke 14 striking against the workpiece when the saw is in operation but the ends of yoke 14 must be easily accessible to a user for replacement of the blade 12 or for placement of the blade around the workpiece. Access to mechanism 10 is also necessary for maintenance, from time to time. However, when the saw is in operation, the user must also be protected from mechanism 10. Therefore, housing 30 is preferably provided as a telescoping assembly of a protective cover 32 and a main housing 34. Both the protective cover 32 and the main housing are preferably of generally rectangular cross-section with the protective cover 32 relatively positionable relative to main housing 34 by telescoping within the main housing 34. This arrangement is deemed preferable to avoid the user applying force against the protective cover in a direction which would cause it to retract while pulling the saw to achieve tension on the blade 12 against workpiece 11, but is not critical to the practice of the invention. For convenience in manipulation of protective cover 32, a fixed grip 36 is also preferably provided. The provision of such a fixed grip 36 allows ease of gripping of the protective cover 32 in order to move it to an extended position in a manner consistent with a very compact layout of the housing 30. One may also use a removable threaded-on hand grip, as it is found in powered hand drills. This removable hand grip is to installed on the main housing 34 support. Similarly, stiffeners or ribs 39 are also preferably formed on the housing 34 to provide security of gripping when the saw is in use and to provide increased structural stiffness of the housing 34, particularly where internal stiffening is not possible due to the internally telescoping protective cover 32. The telescoping arrangement of housing 30 also provides for a compact safety switch 38 which will be discussed in greater detail below with reference to FIG. 3.

Internally of main housing 34, a frame 50 is provided to carry mechanism 10 and motor 40. It should also be understood, however, that the saw in accordance with the invention could be embodied as an attachment for any rotary portable power tool such as a drill, in which case, it is only necessary to provide a shaft 42' (and omitting motor 40) protruding from main housing 34. It would also be preferable, but not necessary to provide a mounting structure, not shown, such as a collar, for attaching the saw to such a power tool. Whether or not motor 40 is provided in housing 30, shaft 42 preferably drive the rotary motion of pin 26, preferably through gearing such as a worm gear drive or bevel gears 44, 46. Speed reduction in this gearing may also be necessary to achieve a blade reciprocation rate of under about 600 strokes per minute or other rate dictated by optimum blade speed. In this regard, it is contemplated that the saw in accordance with the invention, although it could theoretically be scaled to any needed size would have a yoke 14 of about two inches in length, resulting in a blade stroke of about the same dimension. A larger saw should have a reduced reciprocation rate to avoid scaling of the blade speed with the saw size. This reduction in reciprocation rate is generally preferable to reducing blade stroke length to avoid filling of the abrasive with material from the saw kerf when cutting larger workpieces within the capabilities of larger saws.

It is also possible to provide the saw in accordance with the invention as an attachment for a reciprocating power tool such as a so-called jig saw or saber saw by providing a simple linkage, not shown, such as a slidable member carrying pin 26, for direct reciprocation of pin 26 in the direction indicated by arrows 26' to cause reciprocation of arm 22.

Frame 50 is preferably formed with a portion 54 for attachment to the main housing 34 and an extended member 52 which is shaped to allow retraction of the protective cover 32 within the main housing 34 while locating most of mechanism 10 beyond the end of main housing 34 and protective cover 32, when retracted. This elongated portion 52 does not weaken the structure since, when the saw is in use, portion 52 is principally in tension, carrying force applied by the user to main housing 34 to the bearing at the pivot 16 of yoke 14. Some flexibility of portions 52 may reduce transmission of vibration to the user. Further, some flexibility of portions 52 is desirable in order to provide some degree of self alignment of the yoke with the direction of the cut to be made when the user applies blade tensioning force to the main housing 34. In this regard, it is preferable that the frame 50 be formed as two similar members, generally of the shape illustrated so that arm 22 and, especially, yoke 14 can be pivoted on axles which are symmetrically supported by both such members rather than being cantilevered from a single member. In this way, sufficient strength of the frame 50 can be achieved at low weight.

In use, after blade 12 has been positioned around workpiece 11, protective cover 32 is extended to position 32' which is sufficient to cover any position of the ends of yoke 14. The end 33 of protective cover 32 may be contoured, as shown, to cover the range of motion of yoke 14 while allowing increased proximity to the workpiece. When protective cover 32 is extended, it may preferably be held in place with a wing bolt 37 or some form of user releasable latch or detent, such as a spring driven pawl. Whatever mechanism in used, it is preferred that it be vibration resistant and protected from accidental release during gripping of the main housing by the user. As a further protection against retraction of protective cover 32 during use, a safety switch 38 is also provided in series with operating switch 39. In some configurations of the main housing 34 and protective cover 32, the safety switch could be used as an operating switch. For example, protective cover 32 could be arranged to bear against the workpiece (e.g. to assist in avoiding closing of the kerf by flexure of the workpiece as the cut is made) and the saw operated only by switch 38 when the mechanism had been drawn back from the workpiece to tension the blade 12 and move yoke 14 a sufficient distance from the workpiece. In any event, a preferred structure of safety switch 38 will now be discussed with reference to FIG. 3.

Figure 3:
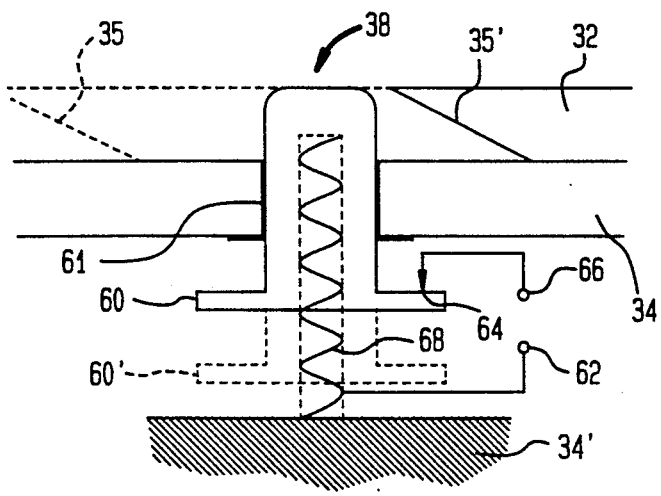
FIG. 3 illustrates the general structure and operation of the safety switch of FIG. 2.

As shown in both FIGS. 2 and 3, some portion of the protective cover is formed with an inclined cam 35. The position of cam 35 is arbitrary and, while a cam is considered to be preferred, it should be understood that other mechanisms could also be used. The preferred inclined shape of the cam is not critical to the invention. The safety switch 38 could also be incorporated with a latch or detent, represented by wing bolt 37. In a preferred form of the safety switch 38 shown in FIG. 3, a movable conductive switch member 60 is urged toward the interior of main housing 34 by a suitably supported spring 68. Switch member is preferably formed in a radially symmetric fashion with a T-shaped cross-section and of a conductive material such as copper. Electrical connection from switch terminal 62 to moveable switch member 60 is preferably done through spring 68 since flexure of other electrical connections is thereby avoided. The size of the spring and the thickness of the switch member 60 may be determined in accordance with the current requirements of the motor 40 or other portable power tool. Since it is preferred that main housing 34 be made of a non-conductive polymer or plastic material, moveable switch member 60 may be guided by an aperture provided therein. However, if housing 34 is metallic, a non-conductive bushing 61 must be used. Contact 64 is mounted in any convenient fashion on main housing 34 or insulating bushing 61 and preferably forming an annulus surrounding movable switch member 60. The position of switch contact 66 or some other spacer structure should be such that no portion of the moveable switch member 60 can move farther inward than the inner surface of the protective cover (or the innermost extent of cam 35). The end of the moveable switch member 60 may also be tapered or shaped to better cooperate with cam 35.

When the protective cover is in the retracted position as shown in FIG. 2 and in phantom in FIG. 3 by the cam position 35, movable switch member 60 will be held in a lower position 60' by the protective cover 32 (after having been moved to that position by cam 35). In position 60', the flange of moveable member 60 is held apart from switch contact 68 and safety switch 38 is in an open condition. When the protective cover 32 is in the fully extended position, cam 35 will be drawn away (to position 35') from the moveable member 60 which will then be urged inwardly and into contact with contact 68 by spring 68. Thus, a conductive path 62, 68, 60, 64, 66 will be formed with the safety switch in the closed position. Thus, safety switch 38, whether used in series with another switch (e.g. 39) or to directly control the saw motor 40, prevents operation of the saw without the protective cove being positively positioned to cover yoke 14 to a desired degree.

As indicated above, normal operation of the saw in accordance with the invention will require regular access to the ends of yoke 14, at least for the purpose of renewal of the saw blade. If an end of the workpiece is not accessible, for instance, when a pipe to be cut is installed such that is extends the entire distance between other structures, at least one end of the blade must be passed around the workpiece and may thus require detachment of one blade end from the saw. Such detachment must be convenient to the user and possible in close quarters, consistent with some intended uses of the invention outlined above. However, the blade suspension during operation of the saw must not cause undue flexing of the blade as yoke 14 angularly reciprocates.

A structure which accomplishes these objectives is shown in FIGS. 4 and 5. Variations thereof and other structures capable of similar performance will become apparent to those skilled in the art in view of the following detailed description thereof. Specifically, abrasive wire blades are commercially provided with enlarged ends, either by soldering, welding or crimping a small piece of tubing thereto. It is contemplated that for some applications where the blade must be kept short (e.g. for close clearances) or in the case of using pieces of continuous blade stock, crimping of a soft metal (e.g. copper) tube to the blade is considered to be preferable. The roughness of the blade will then emboss the interior of the tube to create a very secure connection for end portion 13.

In order to provide for ease of handling of the blade end, a generally cylindrical support 70 is also provided. The support 70 is preferably of a hard or hardened metal such as steel or brass to be wear-resistant as it rotates within an end of yoke 14, as will be discussed below. The cylindrical support 7 is also provided with at least a hole bored therethrough perpendicular to the axis thereof and a larger partial-depth counter-bored recess to receive the blade end 13 the end of the blade 12 can then be passed through the hole and the blade end 13 crimped thereto to install support 70 on the blade 12. The support 70, being relatively large in comparison with the diameter of the blade can then be used to increase the ease of handling if clearances permit. Alternatively, the blade could be passed around the workpiece prior to the attachment of the support 70 or even the blade end 13 if extremely close clearances require the same.

A preferred form of support 70, to accommodate blades already having blade ends 13 attached, however, additionally includes a slot 72 which takes the place of the hole formed through the support. The counter bore, however, is retained. This configuration allows the blade 12 to be inserted into slot 72, which may be serpentine in shape, and the blade end 13 pulled into the counterbore 74 where a slight interference fit may occur, as shown by arrow 76. Crimped tubing is especially preferred in this case since the deformation of the tubing provides a mechanical interference fit which assists in retaining the support 70 on the end of blade 12 during handling and attachment to the saw yoke 14. A slight interference fit of slot 72 and blade 12 can also be provided, such as with a detent structure in which the major portion of slot 72 is slightly smaller than the bottom thereof near the center of support 70 (e.g. a slot formed to the location of a through hole). Thus, once the blade has been positioned around the workpiece, the support 70 can be easily grasped and inserted into a slot 80 formed in each end of yoke 14 to pivotably secure the blade ends thereto.

After assembling the blade support 70 to the yoke 14, the blade is preferably secured in place by spring 82 which is stretched from a point on the body of the yoke 14 by means of a pin 88 which is slightly longer than the thickness of the yoke end, as shown in FIG. 5, to facilitate placement in and removal from a cooperating groove 86, positioned to provide tension in spring 82. Further, to allow rotation of support 70 in slot 80, a preferably cylindrical spacer 84 is provided and preferably attached to the spring 82 at the periphery of the spacer. As support 80 rotates relative to the angular position of yoke 14 as it is reciprocated, this attachment to spring 82 at the periphery of spacer 84, preferably fabricated of a plastic, allows some rolling motion against the outer surface of support 70. Additionally, the spring itself will allow motion of the spacer at the end of the rolling movement of the spacer and sliding of the spacer 84 against support 70 is largely avoided and free rotation of the support 70 within the slot 80 is provided. Thus, as the yoke 14 is reciprocated through an angular range, the blade can move relative thereto through a corresponding angular range partially indicated by A in FIG. 4 and within recess 90 in the end of yoke 14 as shown in FIG. 5 and flexure of the abrasive coated wire blade is avoided.

An alternative form 84, of spacer 84 is shown in FIG. 6 and its location indicated by dashed line in FIG. 4. In this case, the spacer 84, is formed in the shape of a portion of the material removed in the end of yoke 14 in order to form slot 80. The lower surface of spacer 84, thus forms a bearing surface against support 70 and flexure of spring 82 during reciprocation of yoke 14 and relative rotation of support 70 can be avoided if the width of spacer 84, coincides with the width of slot 80. If spacer 84, is made somewhat more narrow than slot 80, the operation of spacer 84, will resemble that of cylindrical spacer 84 except that a slight sliding motion will occur with spacer 84, rather than the rolling motion of cylindrical spacer 84. Incidentally, holes 94 are illustrated in FIG. 6 for attachment of the spacer 84, to spring 82 by a wire or by threading spring 82 therethrough. This is also exemplary of a suitable means for similar attachment of cylindrical spacer 84 to spring 82, if desired.

While the passage of the blade through recess 90 will prevent disengagement of the cylindrical support from the yoke 14 in a direction axial to the cylindrical support 70, It is also desirable that the blade not be allowed to come into contact with the sides of recess 90. Therefore, cylindrical support 90 is preferably restrained in the axial direction by a simple arrangement such as a wire 92 attached (e.g. spot-welded) across slot 80 at the location where cylindrical support 70 is seated during operation. Other suitable arrangements include flanges formed at the ends of the cylindrical support which would ride against the top and bottom surfaces of the yoke ends.

Referring now to FIG. 7, a preferred form of the switch of FIG. 3 will be described. It is to be understood that the principles of operation are the same as described above, but preferred perfecting features thereof, not necessary to the practice of the invention, were omitted from FIG. 3 and the discussion thereof in the interest of clarity. Therefore this discussion will be limited to these perfecting features.

As shown in FIG. 7, the schematically illustrated support 34' for spring 68 is provided by means of a threaded plug 134, driven into a threaded opening 112 in housing 34 by means of a recess such as screwdriver slot 110, provided in the plug. This type of support provides for renewal or maintenance (e.g. cam lubrication) of the spring and switch parts such as 60, having a smaller diameter than threaded opening 112, without disassembly of the tool. An insulative bearing 114 is also preferably provided, in the form of a plastic washer, for movable switch member 60 which can also be lubricated and/or renewed through opening 112. A further washer-like structure 116 having a wire 118 embedded therein is also preferred as a stress-relieved form of electrical connection as an alternative to providing an electrical connection to switch member 60 through spring 68. This connection is urged against switch member 60 and/or washer 114 by a further spring 120 which serves to provide separation between contacts 122 and 124 when member 60 is moved to the position illustrated by cam 35 attached to protective cover 32. Spring 120 can be made a number of ways, such as a wave shaped light spring washer, a set of light belleville light springs or a set of ordinary helical springs welded on to a plain washer.

In the preferred embodiment of FIG. 7, electrical connection is made to contact 122 through wiring 126 supported by (e.g. cemented to or embedded in an interior surface of housing 34. Further, while the major portion of the switch structure can be renewed easily, as described above, reducing the significance of wear of the switch parts, a metallic liner 130 is preferably provided on the exterior of protective cover 32 at the location of cam 35 to increase wear resistance for this single part which would require housing disassembly for replacement.

In view of the foregoing, it is seen that the invention provides a power saw suitable for making cuts of workpieces where very limited clearances are available in the vicinity of the intended cut and which may be safely operated in close quarters, particularly through the use of a protective cover and an associated interlock switch. Blade handling is facilitated by the provision of a blade end support which is attachable to the blade end and which provides a suspension for the blade when the saw is operated that limits or eliminates flexure of the ends of the blade.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A saw blade driving mechanism for reciprocatingly drawing a flexible, abrasive coated wire across a workpiece, said mechanism including,
   a housing,
   a pivotable yoke including a pivot supported by said housing,
   means for reciprocatingly driving said pivotable yoke through a predetermined angle about said pivot,
   a protective cover attached to said housing and positionable to cover at least a portion of said pivotable yoke, and
   a switch arranged to be responsive to said protective cover being positioned to cover said at least said portion of said pivotable yoke.

2. A mechanism as recited in claim 1, further including a motor contained within said housing.

3. A mechanism as recited in claim 1, further including a means for attaching said mechanism to a power tool.

4. A mechanism as recited in claim 1, wherein said switch is operated by a cam supported by at least one of said housing and said protective cover.

5. A mechanism as recited in claim 1, wherein said housing and said protective cover form a telescoping assembly.

6. A mechanism as recited in claim 5, wherein said protective cover telescopes within said housing.

7. A mechanism as recited in claim 5, wherein said switch is operated by a cam supported by at least one of said housing and said protective cover.

8. A mechanism as recited in claim 6, wherein said switch is operated by a cam supported by at least one of said housing and said protective cover.

9. A mechanism as recited in claim 1, wherein said pivotable yoke includes
   means for pivotably securing said blade to each of two ends of said pivotable yoke.

10. A mechanism as recited in claim 9, wherein said means for pivotably securing said blade further includes
    a cylindrical support having an aperture therein and a recess for engaging a blade end portion.

11. A mechanism as recited in claim 10, wherein said aperture is a slot.

12. A mechanism as recited in claim 10, wherein at least one of said aperture and said recess provide an interference fit against at least one of said blade and said blade end portion.

13. A mechanism as recited in claim 11, wherein at least one of said slot and said recess provide an interference fit against at least one of said blade and said blade end portion.

14. A mechanism as recited in claim 10, wherein said means for pivotably supporting said blade further includes spring means for retaining said cylindrical support within a slot formed in an end of said pivotable yoke.

15. A mechanism as recited in claim 14, wherein said means for pivotably supporting said blade further includes a spacer between said spring means and said cylindrical support.

16. A mechanism as recited in claim 5, wherein said pivotable yoke includes means for pivotably securing said blade to each of two ends of said pivotable yoke.

17. A mechanism as recited in claim 16, wherein said means for pivotably securing said blade further includes a cylindrical support having an aperture therein and a recess for engaging a blade end portion.

18. A mechanism as recited in claim 17, wherein said aperture is a slot.

19. A mechanism as recited in claim 17, wherein at least one of said aperture and said recess provide an interference fit against at least one of said blade and said blade end portion.

20. A mechanism as recited in claim 19, wherein at least one of said slot and said recess provide an interference fit against at least one of said blade and said blade end portion.

21. A mechanism as recited in claim 17, wherein said means for pivotably supporting said blade further includes spring means for retaining said cylindrical support within a slot formed in an end of said pivotable yoke.

22. A mechanism as recited in claim 21, wherein said means for pivotably supporting said blade further includes a spacer between said spring means and said cylindrical support.

* * * * *